(12) United States Patent
So (10) Patent No.: US 10,004,208 B2
(45) Date of Patent: Jun. 26, 2018

(54) METHOD AND DEVICE FOR TRACKING LOCATION OF ANIMAL

(71) Applicant: DOGTRA CO., LTD., Incheon (KR)

(72) Inventor: Min Jae So, Seoul (KR)

(73) Assignee: DOGTRA CO., LTD., Incheon (KR)

( * ) Notice: Subject to any disclaimer, the term of this patent is extended or adjusted under 35 U.S.C. 154(b) by 0 days. days.

(21) Appl. No.: 15/264,468

(22) Filed: Sep. 13, 2016

(65) Prior Publication Data
US 2018/0070559 A1   Mar. 15, 2018

(51) Int. Cl.
*G01S 19/13* (2010.01)
*A01K 29/00* (2006.01)
*A01K 11/00* (2006.01)

(52) U.S. Cl.
CPC ............ *A01K 11/008* (2013.01); *G01S 19/13* (2013.01)

(58) Field of Classification Search
CPC ...................................................... G08B 23/00
See application file for complete search history.

(56) References Cited

U.S. PATENT DOCUMENTS

| 7,602,302 | B2 | 10/2009 | Hokuf et al. |
| 8,823,513 | B2 | 9/2014 | Jameson et al. |
| 8,947,241 | B2 | 2/2015 | Trenkle et al. |
| 9,449,487 | B1* | 9/2016 | Spitalny ............... A01K 15/023 |
| 2009/0096576 | A1* | 4/2009 | Oman .................... G07C 5/008 |
| | | | 340/5.62 |
| 2012/0182145 | A1* | 7/2012 | Jameson .............. A01K 11/008 |
| | | | 340/539.13 |
| 2012/0252486 | A1* | 10/2012 | Lopez .................. A01K 15/021 |
| | | | 455/456.1 |
| 2013/0225117 | A1* | 8/2013 | Giacoletto ............. H04W 4/22 |
| | | | 455/404.2 |
| 2014/0232541 | A1* | 8/2014 | Trenkle ................. G08B 25/10 |
| | | | 340/539.13 |

FOREIGN PATENT DOCUMENTS

KR   10-2013-0057683 A    6/2013

\* cited by examiner

*Primary Examiner* — Joseph Field
*Assistant Examiner* — Pameshanand Mahase

(57) ABSTRACT

Disclosed is an animal tracking device, which is worn by an animal and tracks a location of the animal, the animal tracking device including: a location determining unit configured to determine a current location according to information received from a GPS antenna; a sensor configured to determine state information about the animal; a device identification information storing unit configured to store device identification information for identifying a device; a battery configured to supply power; a first communication unit configured to perform RF communication with a user's device; and a main control unit, which controls the device, and controls the first communication unit to communicate with the user's device through another animal tracking device registered in the user's device, and a system including the same and a method of tracking a location of an animal.

18 Claims, 8 Drawing Sheets

METHOD AND DEVICE FOR TRACKING LOCATION OF ANIMAL

TECHNICAL FIELD

The present invention relates to a method and a device for tracking a location of an animal. More particularly, it relates to a method and a device for tracking a location of an animal, which may track a location of an animal, and take an appropriate response in a state where it is not smooth to track a location of an animal.

BACKGROUND ART

A technology for tracking a location of a pet or a wild animal has been variously utilized. In a case of a pet, a tracking technology for preventing the pet from being lost or confirming a location of the pet at an indoor side is used. In the meantime, in a case of a wild animal, a location tracking technology is used for confirming the ecology or a habit of the wild animal.

In order to confirm and track a location of an animal, a global positioning system (GPS) technology is generally used. The GPS is a satellite navigation system which receives a location signal transmitted from a GPS satellite and calculates a current location of a user. Traditionally, the GPS is mainly used in a navigation device of an airplane, a vessel, and an automobile, and recently, the GPS is also used in an animal training device or for tracking a location of an animal, such as a hunting dog, located at a remote place.

For example, U.S. Pat. No. 7,602,302 (registered on Oct. 13, 2009) discloses an animal tracking device, which is worn by an animal and is operable, determines a current geological location of the animal, and transmits the current geological location to a navigation unit possessed by a user. However, the related art is applied to a case where communication is available between the tracking device worn by the animal and the navigation unit possessed by the user, and has a limitation in that there is no additional consideration about a case where communication is not smooth between the tracking device and the navigation unit (for example, a case where it is impossible to recognize the location of the animal due to the getting out of a communication range).

Korean Patent Application Laid-Open No. 10-2013-0057683 (published on Jun. 3, 2013) filed by the applicant of the present invention discloses "Animal Training Device for Confirming Location of Collar Transceiving Apparatus using GPS, and Method of Controlling the Same" which outputs a sound or light according to brightness so that a user may easily confirm a location of an animal wearing a receiver in a region, such as a mountain recess, having narrow visibility. The Korean Patent Application Publication suggests the advantage in that it is possible to easily find a location of an animal by a beep sound or an optical output of a light emitting diode, but does not suggest a method of effectively controlling a collar device worn by an animal, of which a location is not recognized.

In the meantime, an existing animal location tracking system is formed of an animal's unit (for example, a tracking device) worn by an animal, and a user's unit (for example, a navigation unit) possessed by a user. However, it is necessary to store map information in the user's unit, install an operation program, and include a visual display unit, so that there is a problem in increasing a total system price.

SUMMARY OF THE INVENTION

The present invention has been made in an effort to provide a device and a method for tracking a location of an animal, which may track a location of a device worn by an animal when communication is not performed between the device worn by the animal and a device possessed by a user or direct communication therebetween is not smooth.

The present invention has also been made in an effort to provide a system for tracking a location of an animal, which enables a user to track a location of an animal by using a smart phone possessed by the user.

An exemplary embodiment of the present invention provides an animal tracking device, which is worn by an animal and tracks a location of the animal, the animal tracking device including: a location determining unit configured to determine a current location according to information received from a GPS antenna; a sensor configured to determine state information about the animal; a device identification information storing unit configured to store device identification information for identifying a device; a battery configured to supply power; a first communication unit configured to perform RF communication with a user's device; and a main control unit, which controls the device, and controls the first communication unit to communicate with the user's device through another animal tracking device registered in the user's device, or an animal tracking device registered in another user's device sharing information with the user's device when the first communication unit and the user's device are not normally communicated.

When a battery level of the battery is not normal, the main control unit may control the animal tracking device in a save mode which increases a transmission period of the first communication unit.

When the battery level is not normal, the main control unit may turn off a reception function of the first communication unit, and increase a reception period of the GPS antenna.

When the current location goes beyond a predetermined boundary or a predetermined distance from the user's device, or a current time elapses a predetermined time, the main control unit may give a return command by operating a stimulating unit, which applies a stimulus to the animal, or outputting a sound through a speaker.

The user's device may include a relay unit including a second communication unit communicating with the first communication unit, and a navigation unit communicating with the relay unit through a short range communication network and including a visual display, and the animal tracking device may communicate with the navigation unit through the relay unit.

When the communication with the user's device is not performed, the main control unit may decrease a communication speed per hour of the first communication unit.

The main control unit may change a transmission data format to be transmitted through the first communication unit and decrease a size of data to be transmitted.

Another exemplary embodiment of the present invention provides a system for tracking a location of an animal, which includes an animal tracking device worn by an animal, and a user's device communicating with the animal tracking device, in which the user's device includes a relay unit, which performs RF communication with the animal tracking device, displays information transmitted from the animal tracking device, outputs a control signal controlling the animal tracking device, performs short range communication with a navigation unit including a GPS receiver and a visual display, and relays communication between the animal tracking device and the navigation unit, and the animal tracking device includes: a location determining unit configured to determine a current location according to information received from a GPS antenna; a sensor configured to determine state information about the animal; a device identification information storing unit configured to store device identification information for identifying a device; a battery configured to supply power; a first communication unit configured to perform RF communication with a user's device; and a main control unit configured to control the animal tracking device, and when the communication between the relay unit and the animal tracking device is not normally performed, the communication between the relay unit and the animal tracking device is performed through another animal tracking device registered in the relay unit, or an animal tracking device registered in another relay unit sharing information with the relay unit.

The navigation unit may be a smart phone, and the navigation unit may display the current location of the animal tracking device on a map provided to the navigation unit together with a current location of the navigation unit.

The plurality of navigation units may be included, and the plurality of relay units may be included in each of the navigation unit, and information from the animal tracking device registered to any one relay unit may be shared with another relay unit.

When a battery level of the battery is not normal, the main control unit of the animal tracking device may control the animal tracking device in a save mode which increases a transmission period of the first communication unit.

When the current location of the animal tracking device goes beyond a predetermined boundary or a predetermined distance from the user's device, or a current time elapses a predetermined time, the animal tracking device may give a return command by operating a stimulating unit, which applies a stimulus to the animal, or outputting a sound through a speaker.

When the communication between the animal tracking device and the relay unit is not performed, the main control unit of the animal tracking device may decrease a communication speed of the first communication unit.

Yet another exemplary embodiment of the present invention provides a method of tracking a location of an animal through an animal tracking device, which is worn by an animal and tracking a location of the animal, and a user's device communicating with the animal tracking device, the method including: setting a basic condition for tracking the animal, the basic condition including at least one of a movement boundary or distance and an operation time of the animal tracking device, and performing a normal operation mode which tracks a location of the animal through communication between the animal tracking device and the user's device; determining whether a state of the communication between the animal tracking device and the user's device is normal; and when the state of the communication between the animal tracking device and the user's device is not normal, performing a relay mode which makes an attempt to communicate with the user's device through another animal tracking device registered in the user's device, or an animal tracking device registered in another user's device sharing information with the user's device.

The method may further include when a battery level of a battery included in the animal tracking device is equal to or smaller than a predetermined reference value, performing, by the animal tracking device, a save mode, which decreases the quantity of power consumed of the battery by increasing a transmission period of the first communication unit.

The method may further include when the relay mode is performed, but the communication between the animal tracking device and the user's device is not performed, performing an SOS mode which decreases a transmission speed from the animal tracking device to the user's device.

In the SOS mode, the animal tracking device may change a data format to be transmitted.

According to the exemplary embodiments of the present invention, it is possible to communicate with the animal tracking device through the relay mode when the communication between the animal tracking device worn by an animal and a user's device is not smooth.

According to the exemplary embodiments of the present invention, it is possible to increase a possibility in communicating with a user's device by changing an operation mode of the animal tracking device when the communication between the animal tracking device and the user's device is not available, and increase a possibility in finding the animal tracking device by a user.

According to the exemplary embodiments of the present invention, when a plurality of users hunts by using a plurality of animal tracking devices, it is possible to share information on positions and states of the animal tracking devices of the respective users, thereby enabling the users to efficiently hunt animals.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter, exemplary embodiments of the present invention will be described in detail with reference to the accompanying drawings. First, in denoting reference numerals to constituent elements of respective drawings, it should be noted that the same elements will be designated by the same reference numerals although they are shown in different drawings. Further, in the following description of the present invention, a detailed description of publicly known configurations or functions incorporated herein will be omitted when it is determined that the detailed description may make the subject matter of the present invention unclear. Further, an exemplary embodiment of the present invention will be described below, but the technical spirit of the present invention is not limited thereto and may be modified and variously implemented by those skilled in the art.

Figure 1:
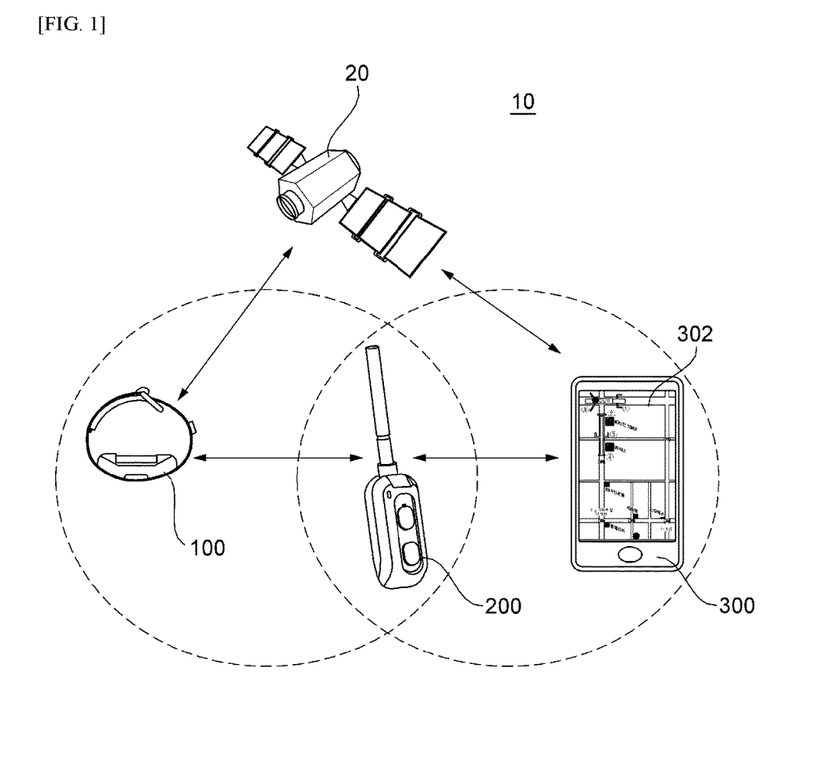
FIG. 1 is a diagram illustrating a basic configuration of an animal location tracking system according to an exemplary embodiment of the present invention.

FIG. 1 is a diagram illustrating a basic configuration of an animal location tracking system according to an exemplary embodiment of the present invention.

An animal location tracking system 10 according to the exemplary embodiment of the present invention includes an animal tracking device 100 worn by an animal, and user's devices 200 and 300 communicating with the animal tracking device 100. The user's devices 200 and 300 may include a relay unit 200 communicating with the animal tracking device 100, and a navigation unit 300 communicating with the relay unit 200. The relay unit 200 and the navigation unit 300 may be carried by a user. For example, the relay unit 200 may be mounted on clothes or a bag of the user and carried, and the navigation unit 300 may be used in a state where the user holds the navigation unit 300 with a hand.

The animal tracking device 100 is a device worn by an animal, and may be mounted on a neck of an animal in a collar form, or worn on the animal's body in a harness form. The animal tracking device 100 may receive a signal from a satellite 20 and determine a current location, and may include an acceleration sensor or a gyro sensor and determine a movement or a posture of an animal, and may include a microphone and sense a sound of an animal. Further, the animal tracking device 100 may include a stimulating unit for applying a stimulus to an animal. The animal tracking device 100 may transmit a current location and a state of an animal to the relay unit 200 while communicating with the relay unit 200, and may receive a control signal from the relay unit 200.

The relay unit 200 relays communication with the animal tracking device 100. The relay unit 200 transmits the current location and the state of the animal received from the animal tracking device 100 to the navigation unit 300. Further, the relay unit 200 transmits a control signal from the navigation unit 300 to the animal tracking device 100.

The navigation unit 300 may receive a signal from the satellite 20 and determine a current location of the navigation unit 300. The navigation unit 300 may include a visual display 302, and may output map information through the visual display 302 and display a location of the animal tracking device 100 and/or the state of the animal, and the location of the navigation unit 300 together with the map information. When the navigation unit 300 is included in a smart phone, the map information may be autonomously stored, or map information provided by another application program may be utilized. For example, the map information may be Google Map provided by Google.

The visual display 302 may be provided in a form of a touch screen. Further, the navigation unit 300 may provide a user interface allowing a user's input for controlling the animal tracking device 100 or a user's input for setting the navigation unit 300.

In the exemplary embodiment, the navigation unit 300 may be a smart phone. The smart phone includes an operation system, is accessible to a mobile communication network, includes a short range communication means, such as Bluetooth or WiFi, includes a global positioning system (GPS) receiver, and includes the visual display 302. The smart phone is a popular device according to the development of the mobile communication technology, and when application software for tracking a location of an animal according to the present invention is installed in the smart phone, it is not necessary to separately buy a terminal for tracking a location of an animal.

However, when the animal tracking device 100 includes a separate RF communication means without using a mobile communication network, direct communication between the smart phone and the animal tracking device 100 may be difficult. To this end, the present invention suggests the relay unit 200 relaying the communication between the navigation unit 300 and the animal tracking device 100.

As illustrated in FIG. 1, a first communication network 30 is formed between the animal tracking device 100 and the relay unit 200, and a second communication network 40 is formed between the relay unit 200 and the navigation unit 300. The first communication network 30 may be a long range communication network. For example, the first communication network 30 may use an RF communication scheme using a frequency of several tens to several hundreds of MHz. The second communication network 40 may be a short range communication network. The second communication network 40 may use various communication schemes, such as Bluetooth, WiFi, infrared rays (IR), WiMax, ultra-wideband (UWB), and ZigBee.

Figure 2:
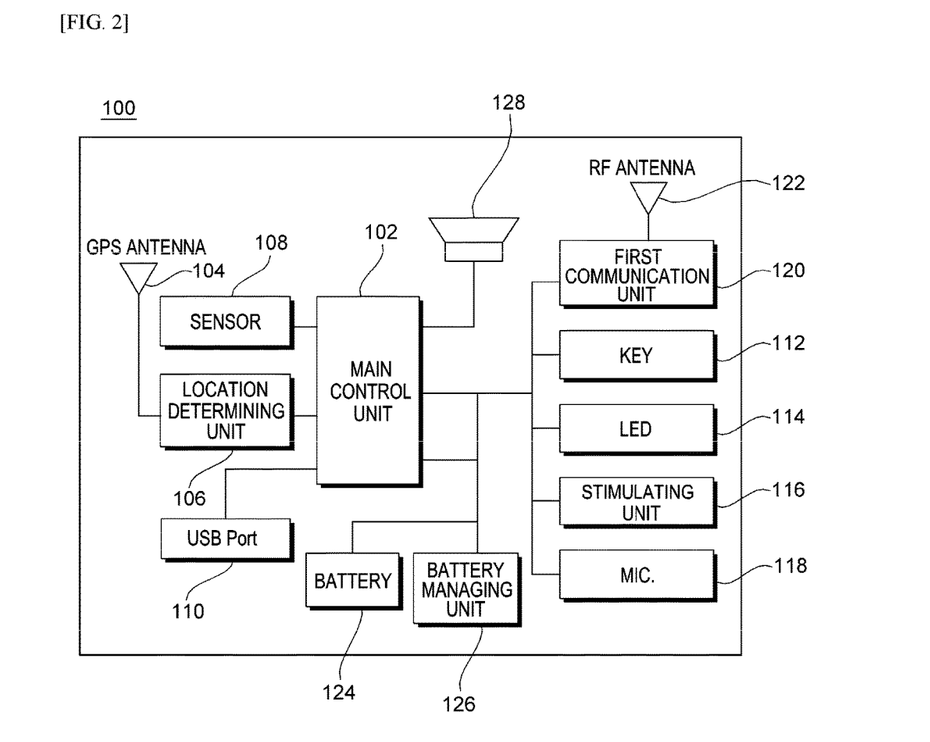
FIG. 2 is a block diagram illustrating an animal tracking device included in the animal location tracking system according to the exemplary embodiment of the present invention.

FIG. 2 is a block diagram illustrating the animal tracking device included in the animal location tracking system according to the exemplary embodiment of the present invention.

The animal tracking device 100 includes a main control unit 102 generally controlling the device, a location determining unit 106 determining a current location, and a first communication unit 120 communicating with the relay unit 200. The location determining unit 106 may include a GPS antenna 104. The location determining unit 106 may receive information from the GPS antenna 104, which receives a signal from the satellite 20, and determine a current location of the animal tracking device 100 by using a GPS technology. The first communication unit 120 may communicate with the relay unit 200 by using an RF communication technology. To this end, the first communication unit 120 may include an RF antenna 122.

The animal tracking device 100 includes a sensor 108 for determining a current state of an animal. The sensor 108 may be an acceleration sensor, a gyro sensor or a compass sensor. The sensor 108 may provide information on a movement or a posture of an animal, and the main control unit 102 may determine the posture of the animal by using the information from the sensor 108. In the meantime, the sensor 108 may be operated in a predetermined period. The animal tracking device 100 may include an access port 110 accessible with an external device, and the access port 110 may be a USB port.

The animal tracking device 100 may include a device identifying information storing unit 112 which stores device identification information for identifying a device. The device identification information may be set to have a different value for each animal tracking device 100, and the animal tracking device 100 may be registered in a specific relay device 200 or navigation device 300 by using the device identification information.

The animal tracking device 100 may further include an LED 114 for emitting light, a stimulating unit 116 applying a stimulus to an animal, a microphone 118 receiving a sound of an animal or a surrounding sound, a battery 124 supplying power, and a speaker 128 transmitting a sound to an animal. The animal tracking device 100 may include a vibrating element transmitting a vibration to an animal.

The LED 114 may be used for representing a current state of the animal tracking device 100 or indicating a location of the animal tracking device 100 by using light. The stimulating unit 116 may include an electrode applying an electric stimulus to an animal. The stimulating unit 116 may apply an electric stimulus to an animal with predetermined intensity or a predetermined interval under the control of the main control unit 102. The microphone 118 may receive a barking sound of an animal, or a signal generated from a surrounding environment. For example, a barking sound of a hunting dog may be different according to a state during a process of tracking a quarry. A hunting dog may make a growling sound in a state of confronting a quarry. Otherwise, a hunting dog may be trained to bark in a specific manner in a state where a quarry has climbed a tree. The main controller 102 may determine a current state of an animal or a state of the track of a quarry according to a sound input through the microphone 118, or may transmit the sound to the navigation unit 300 and the navigation unit 300 may determine the state.

The battery 100 may supply power for operating the animal tracking device 100, and a battery management unit 126 may monitor the quantity of charge of the battery 100 and control a usage state of the battery 100. The speaker 128 may output a specific sound to an animal, and when the speaker 128 receives a voice signal from a user, the speaker 128 may output the voice signal.

The main control unit 102 controls current location information determined by the location determining unit 106 and information input from the sensor 108 or the microphone 118 to be transmitted to the relay unit 200 through the first communication unit 120 together with the device identification information thereof, and performs a function of controlling operations of the LED 114, the stimulating unit 116, the speaker 128, the battery 124, and the like according to a control signal transmitted from the relay unit 200 or an autonomous determination.

In the meantime, the main control unit 102 and the relay unit 200 may communicate in a predetermined period.

Figure 3:
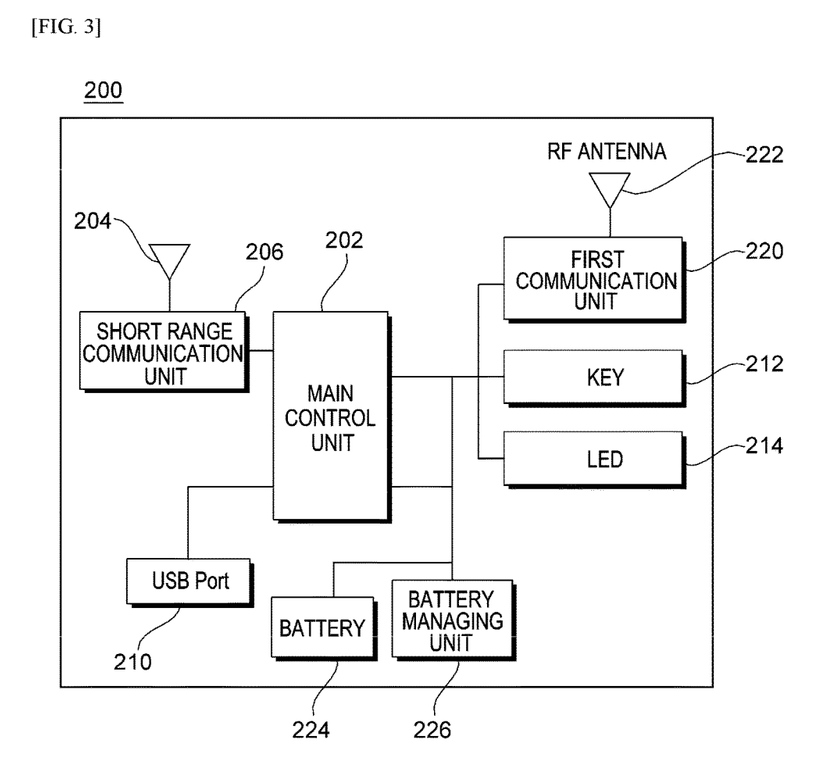
FIG. 3 is a block diagram illustrating a relay unit included in the animal location tracking system according to the exemplary embodiment of the present invention.

FIG. 3 is a block diagram illustrating the relay unit included in the animal location tracking system according to the exemplary embodiment of the present invention.

The relay unit 200 includes a main control unit 202 for generally controlling the device, a short range communication unit 206 for short range communication with the navigation unit 300, and a second communication unit 220 for communicating with the animal tracking device 100. The short range communication unit 206 includes a short range communication antenna 204. The second communication unit 220 includes an RF antenna 222 for communication.

The relay unit 200 may include a relay unit identification information storing unit 214 storing relay unit identification information for identifying a relay unit, and the relay unit 200 may be registered in a specific navigation unit 300 by using the relay unit identification information. Further, the relay unit 200 may include a USB port 210 for an electric connection with an external device, a battery 224 supplying power, and a battery management unit 226 managing the battery 224.

Figure 4:
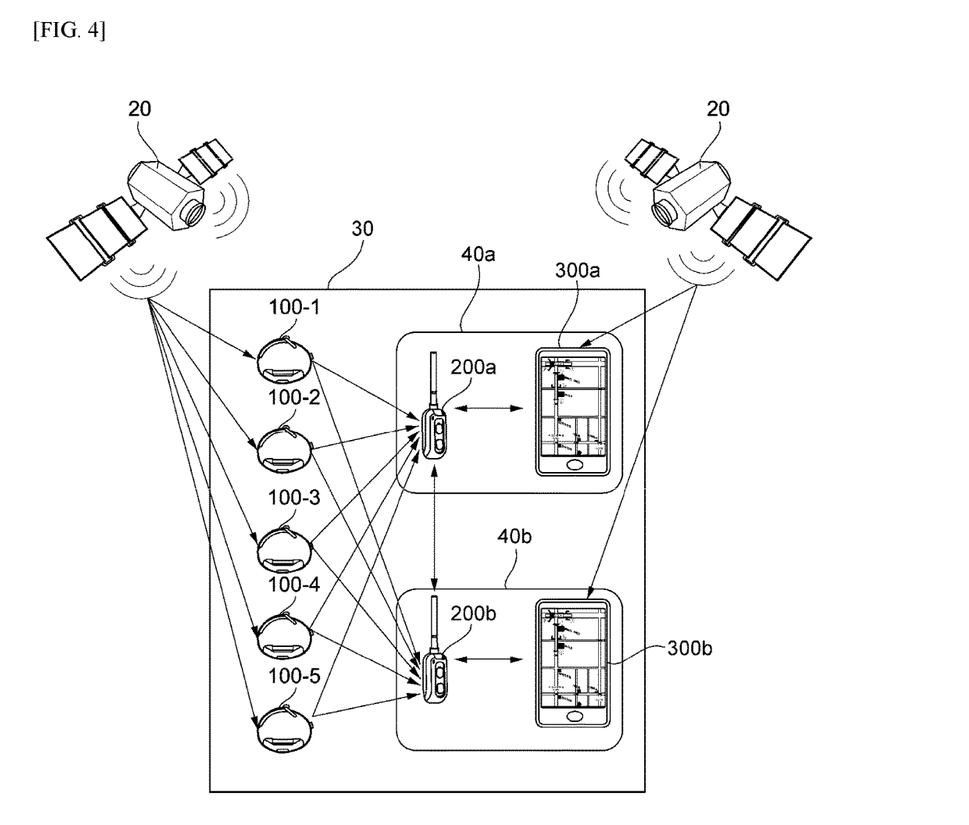
FIG. 4 is a diagram illustrating an animal location tracking system according to an exemplary embodiment of the present invention including a plurality of animal tracking devices and a plurality of user's devices.

FIG. 4 is a diagram illustrating an animal location tracking system according to an exemplary embodiment of the present invention including a plurality of animal tracking devices and a plurality of user's devices.

Referring to FIG. 4, the animal location tracking system includes a plurality of animal tracking devices 100-1 to 100-5 worn by a plurality of animals, respectively, and a first relay unit 200a and a first navigation unit 300a possessed by a first user, and a second relay unit 200b and a second navigation unit 300b possessed by a second user as a plurality of user's devices. In the exemplary embodiment, some of the plurality of animal tracking devices 100-1 to 100-5 may belong to the first user, and the remainder may belong to the second user.

For example, when the animal tracking device 100 is mounted on a hunting dog, some of the plurality of animal tracking devices 100-1 to 100-5 may be worn by a hunting dog of the first user, and the remainder may be worn by a hunting dog of the second user. Particularly, the first user possesses the first navigation unit 300a and the first relay unit 200a registered in the first navigation unit 300a, and possesses the first animal tracking device 100-1 and the second animal tracking device 100-2 registered through the first relay unit 200a. Here, a relation of the registration is called pairing. In the meantime, the second user possesses the second navigation unit 300b and the second relay unit 200b registered in the second navigation unit 300b, and possesses the third to fifth animal tracking devices 100-3, 100-4, and 100-5 registered through the second relay unit 200b.

The pairing of the navigation units 300a and 300b may be set by the navigation units 300a and 300b, respectively, and a user interface for the setting is provided.

In the meantime, the first and second users may set device information of the first and second users to be shared with another user. The aforementioned sharing is called sharing. To this end, each of the navigation units 300a and 300b provides a user interface for setting sharing. The shared device may be the animal tracking device 100 possessed by the user.

The paired device is controlled by the navigation units 300a and 300b possessed by the first and second users, respectively, and location information on all of the shared animal tracking devices 100 and/or information on a state of an animal may be transmitted to the navigation units 300a and 300b through the relay units 200a and 200b of the users setting the sharing, respectively, and displayed. In this case, the first relay unit 200a may receive information about the animal tracking devices 100-1 and 100-2 paired with the first relay unit 200a and transmit the received information to the second relay unit 200b. Otherwise, information about the animal tracking devices 100-1 and 100-2 paired with the first relay unit 200a may be directly transmitted to the second relay unit 200b. According to the present invention, there is an advantage in that the users setting the sharing may receive all of the information about the entire animal tracking devices 100. Particularly, when a plurality of hunters hunts animals, the hunters may share location information and state information about hunting dogs possessed by the hunters, so that it is possible to effectively hunt animals.

The plurality of animal tracking devices 100-1 to 100-5 communicate with the relay units 200*a* and 200*b* by using the first communication network 30, and the relay units 200*a* and 200*b* communicate with the navigation units 300*a* and 300*b* through the second communication networks 40*a* and 40*b*, respectively. In the meantime, the communication for setting sharing between the first navigation unit 300*a* and the second navigation unit 300*b* may be performed through the communication between the relay units 200*a* and 200*b* as illustrated in FIG. 4, but may also be performed through the direct communication between the navigation units 300*a* and 300*b* as a matter of course. However, when a distance between the navigation units 300*a* and 300*b* is long and thus short-range communication is difficult, communication may be performed by using long-range communication between the relay units 200*a* and 200*b*.

Location information about the plurality of animal tracking devices 100-1 to 100-5 paired and shared with map information and/or state information of an animal may be entirely or selectively displayed on visual displays of the navigation units 300*a* and 300*b*. Further, the navigation units 300*a* and 300*b* autonomously include GPS antennas, so that locations of other navigation units 300*a* and 300*b*, as well as the location of the navigation units 300*a* and 300*b*, may also be displayed in the map information.

In a normal environment, the animal tracking device 100 communicates with the navigation unit 300 through the relay unit 200 according to a set period. The communication period may be set by the navigation unit 300.

However, when the communication with the animal tracking device 100 is not normally performed, an appropriate response is required. Examples of the case where the communication between the animal tracking device 100 and the relay unit 200 is not normally performed include a case where a distance between the animal tracking device 100 and the relay unit 200 is beyond a communication available distance, a case where communication is difficult due to existence of an obstacle between the animal tracking device 100 and the relay unit 200, or a case where the battery of the animal tracking device 100 is short. The communication between the animal tracking device 100 and the relay unit 200 may be restored in a specific case, but when the communication is not performed for a long time, it is impossible to recognize a location of an animal.

When a distance between an animal and the user is beyond a predetermined distance in order to limit a location of the animal, or an animal goes beyond a predetermined area on a map, an action of the animal may be restricted by applying a stimulus by using the stimulating unit 116 provided in the animal tracking device 100. However, when it is impossible to communicate with the animal tracking device 100 worn by the animal or the animal goes beyond a predetermined range even though a stimulus is applied to the animal, the application of the stimulus is not an appropriate solution.

The present invention suggests a solution to a case where the communication with the animal tracking device 100 is not normally performed.

Figure 5:
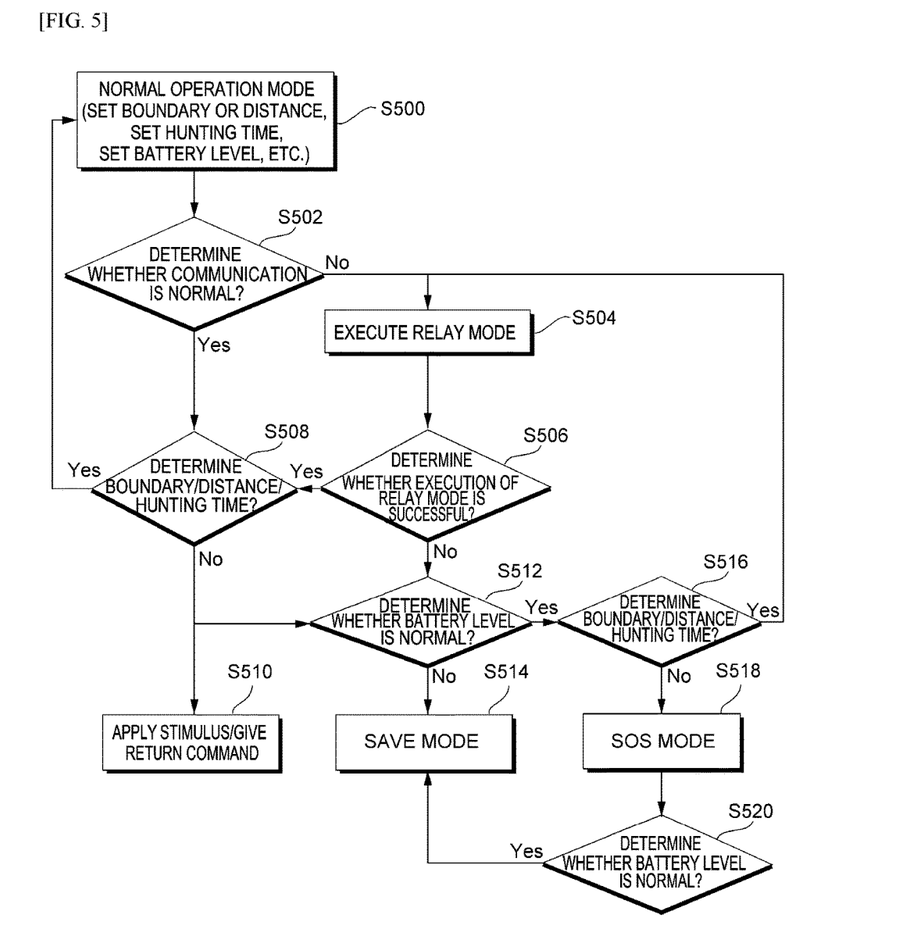
FIG. 5 is a flowchart illustrating an animal location tracking method according to an exemplary embodiment of the present invention.

FIG. 5 is a flowchart illustrating an animal location tracking method according to an exemplary embodiment of the present invention.

A basic condition for tracking a location of an animal is set, and a normal operation mode is performed (S500). Before the normal operation mode is performed, the navigation unit 300 registers the relay unit 200, and registers the animal tracking device 100 worn by the animal through the relay unit 200. In the meantime, as the basic condition, a boundary or a distance for restricting a movement of the animal wearing the animal tracking device 100 may be set, and in a case of hunting, a hunting time may be set and a battery level of the animal tracking device 100 may be set.

In the normal operation mode, the animal tracking device 100 transmits current location information of the animal tracking device 100 and state information about the animal or state information about the device (for example, the battery level) through the communication with user's devices 200 and 300, and receives signals from the user's devices 200 and 300 (S500). Here, the animal tracking device 100 may long-range communicate with the relay unit 200, and the relay unit 200 may short-range communicate with the navigation unit 300 as illustrated in FIG. 1. In the description below, it is described that the animal tracking device 100 and the user's device communicate through the relay unit 200.

It is determined whether a state of the communication between the animal tracking device 100 and the relay unit 200 is normal during a process of performing the normal operation mode (S502). Whether the state of the communication between the animal tracking device 100 and the relay unit 200 is normal may be determined by the main control unit 102 of the animal tracking device 100 or the main control unit 202 of the relay unit 200.

The main control unit 102 of the animal tracking device 100 determines whether the state of the communication between the animal tracking device 100 and the relay unit 200 is normal by checking whether the communication with the user's device continues. In the exemplary embodiment, the animal tracking device 100 communicates with the relay unit 200 through the first communication unit 120. In the determination of whether the state of the communication between the animal tracking device 100 and the relay unit 200 is normal, the animal tracking device 100 transmits the current location information and/or the state information about the animal to the relay unit 200 through the first communication unit 120 in a predetermined period. The relay unit 200 may transmit an acknowledge message to the animal tracking device 100 after receiving a signal from the animal tracking device 100, or transmitting the signal to the navigation unit 300 and confirming the reception of the transmitted signal by the navigation unit 300. The animal tracking device 100 may determine that the state of the communication with the relay unit 200 is normal by receiving the acknowledge message. When the acknowledge message is not received, the animal tracking device 100 may determine that the state of the communication with the relay unit 200 is not normal.

In the meantime, the user's devices 200 and 300 may determine whether the state of the communication with the animal tracking device 100 is normal. In the exemplary embodiment, similar to operation S500, the relay unit 200 or the navigation unit 300 confirms whether a signal is received from the animal tracking device 100 according to a predetermined period. When the signal is not received from the animal tracking device 100 according to the predetermined period, the user's devices 200 and 300 may determine that the state of the communication with the animal tracking device 100 is not normal.

When the animal tracking device 100 determines that the state of the communication with the user's device is not normal, or the user's device determines that the state of the communication with the animal tracking device 100 is not normal, a relay mode may be executed (S504). The relay mode means that the communication between the specific animal tracking device 100 and the user's device (which will be described based on the relay unit 200 hereinafter) is performed through another animal tracking device or another relay unit.

Figure 6:
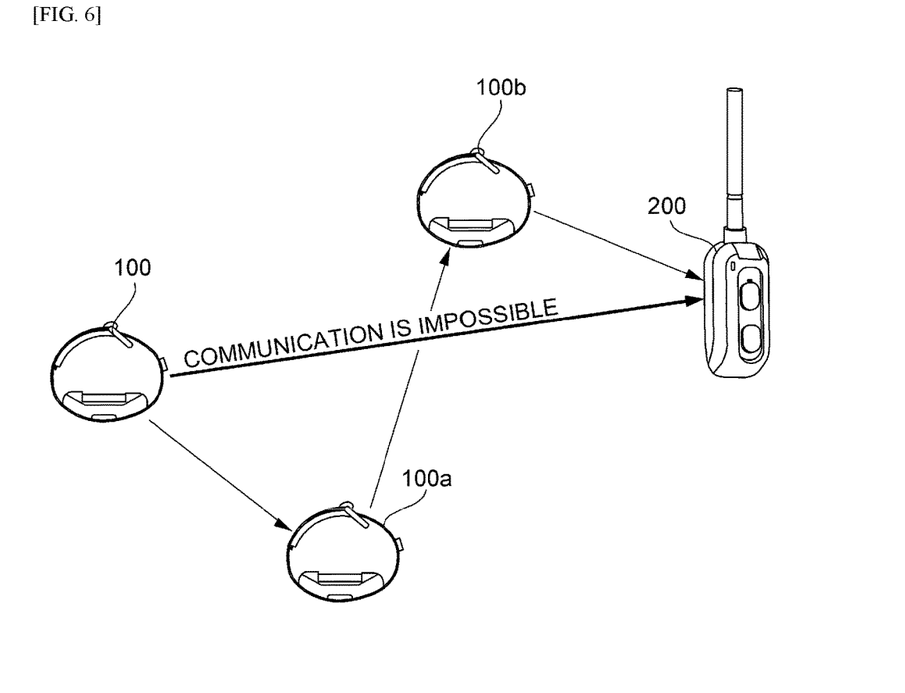
FIG. 6 is a diagram illustrating a relay mode in the animal location tracking method according to the exemplary embodiment of the present invention.

FIG. 6 is a diagram illustrating the relay mode in the animal location tracking method according to the exemplary embodiment of the present invention.

When the communication between the animal tracking device 100 and the relay unit 200 is not normally performed, the animal tracking device 100 communicates with the relay unit 200 through other animal tracking devices 100a and 100b.

In the exemplary embodiment, when the animal tracking device 100, which determines that the communication with the relay unit 200 is not normal, detects signals transmitted from other paired or shared animal tracking devices 100a and 100b, the animal tracking device 100 may transmit the location information of the animal tracking device 100 and the like to the corresponding animal tracking device 100a.

In the exemplary embodiment, the navigation unit 300, which determines that the communication with the specific animal tracking device 100 is not normal, transmits device identification information about the specific animal tracking device 100 to another paired or shared animal tracking devices 100a and 100b. When a signal according to the received device identification information about the specific animal tracking device 100 exists among the signals received through RF communication, other animal tracking devices 100a and 100b transmit the signal to the navigation unit 300 through the relay unit 200. In this case, when other animal tracking device 100b receives the signal according to the device identification information about the specific animal tracking device 100, which has been received and transmitted by any one animal tracking device 100a, the animal tracking device 100b may transmit the information to the relay unit 200 again.

In the relay mode, when a plurality of relay units 200 is provided, another relay unit 200 may receive and transmit the signal, which is transmitted from the animal tracking device 100 paired to any one relay unit 200.

In the meantime, when the relay unit 200 receives the signal from the specific animal tracking device 100 through the relay mode, the relay unit 200 may also transmit the signal to other animal tracking devices 100b and 100a or the specific animal tracking device 100 through another relay unit.

It is determined whether an execution of the relay mode is successful as a result of the execution of the relay mode (S506), and when the relay mode is executed, the current location information about the animal tracking device 100, the state information about the animal, and the like are received through the relay mode.

In the meantime, when it is determined that the state of the communication is normal in operation S502, or the execution of the relay mode is successful in operation S506, operation S508 may be performed.

In operation S508, the navigation unit 300 or the animal tracking device 100 determines whether the current location of the animal tracking device 100 is within a predetermined boundary or distance and whether a predetermined hunting time elapses (S508). When it is determined that the setting condition is satisfied in operation S508, the process returns to operation S500 and the normal operation mode is continuously performed. However, when the setting condition is not satisfied as a result of the determination in operation S508, the animal tracking device 100 may be controlled to apply a stimulus to the animal through the stimulating unit 116. Further, the animal tracking device 100 may give a return command commanding the animal to return to the location of the user through an output of a sound or a voice through the speaker 128 or a stimulus of the stimulating unit 116 (S510).

Even when the relay mode fails to be executed, or in the case of the normal operation mode, the animal tracking device 100 determines whether a battery level is normal (S512). When the battery level is greater than a predetermined reference value, it may be determined that the battery level is normal.

When it is determined that the battery level is not normal according to a result of operation S512, the main control unit 102 of the animal tracking device 100 performs a save mode (S514).

Figure 7:
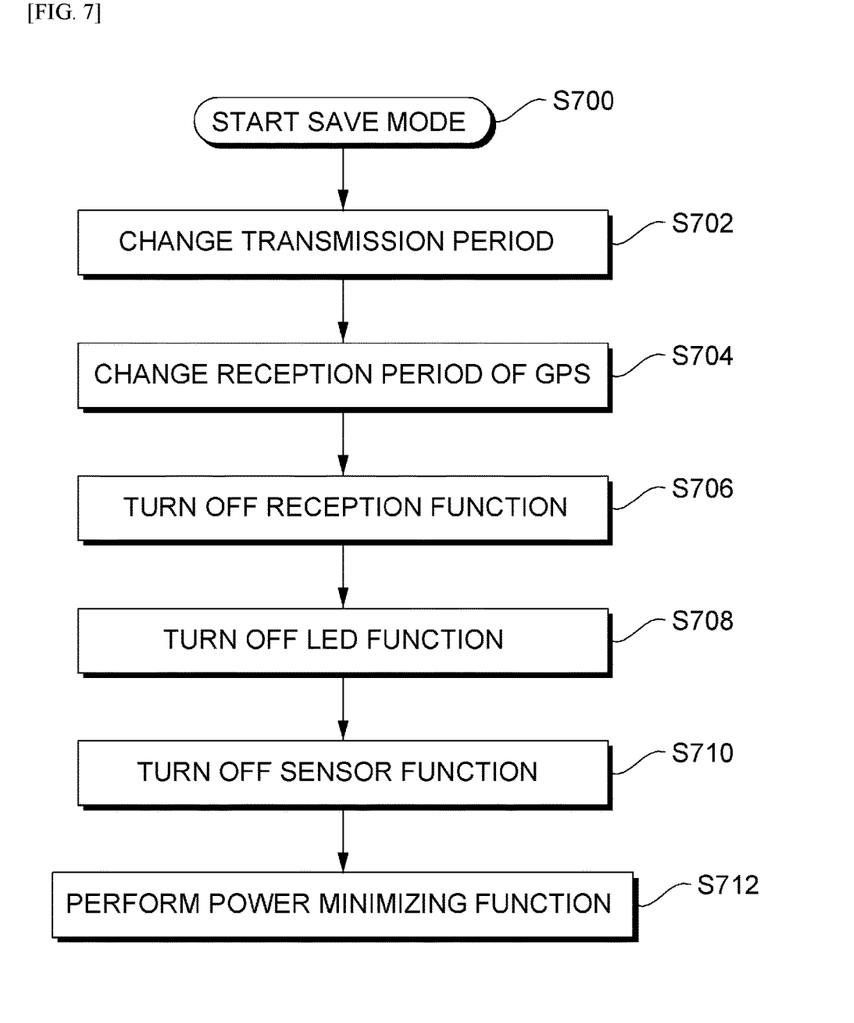
FIG. 7 is a flowchart illustrating a save mode in the animal location tracking method according to the exemplary embodiment of the present invention.

FIG. 7 is a flowchart illustrating the save mode in the animal location tracking method according to the exemplary embodiment of the present invention.

When the battery level of the animal tracking device 100 is equal to or smaller than the reference value, the save mode is initiated (S700). Operations S702 to S710 illustrated in FIG. 7 may be sequentially performed, or may be performed in a changed order or at the same time.

In performing the save mode, a transmission period of the first communication unit 120 is changed (S702). The change of the transmission period may be understood that a transmission period is set to be longer than a basic transmission period. That is, when the animal tracking device 100 transmits the signal through the first communication unit 120 every 10 seconds in the normal operation state, the animal tracking device 100 controls the signal to be transmitted in a longer period (for example, 30 seconds, 50 seconds or 100 seconds) in the save mode.

A reception period of the GPS antenna 104 for determining a current location is changed, that is, the reception period is increased (S704). The reception period of the GPS antenna 104 may be identically set with the transmission period of the first communication unit 120.

A reception function of the first communication unit 120 may be turned off (S706). The animal tracking device 100 may decrease the quantity of battery consumed by only transmitting the current location to the relay unit 200 and enabling the user to recognize the location, and not receiving the signal from the relay unit 200. In the mean time, after predetermined time the reception function of the first communication unit 120 may be turned on. Off and On of the first communication unit 120 may be performed repetitively.

The main control unit 102 may turn off an operation of the LED 114 (S708), and turn off an operation of the sensor 108 (S710). Further, the main control unit 102 may turn off all of the functions, other than the determination function of the location determining unit 106 through the reception from the GPS and the function of transmitting the current location information through the transmission function of the first communication unit 120, thereby minimizing the quantity of battery consumed. Accordingly, the animal tracking device 100 performs a power consumption minimizing function according to the save mode (S712).

When it is determined that the battery level is normal in operation S512, the animal tracking device 100 may determine whether the current location of the animal tracking device 100 is within a predetermined boundary or distance and whether a predetermined hunting time elapses (S516). When it is determined that the current location of the animal tracking device 100 is within the predetermined boundary or distance and whether the predetermined hunting time does not elapse as a result of the determination in operation S516, the process may return to operation S504, and the communication with the relay unit 200 may be attempted.

When the determination in operation S516 is negative, or the relay mode is repeatedly attempted by returning to operation S504, but the execution of the relay mode is failed, an SOS mode is executed (S518). The SOS mode may be understood as a mode for increasing a possibility of the communication with the relay unit 200 or the execution of the relay mode. In the meantime, in a case of a night time, in the SOS mode, the main control unit 102 may assist the user to find the animal tracking device 100 by making the LED 114 to emit light.

When the determination in operation S516 is that the current location of the animal tracking device 100 is not within a predetermined boundary or distance and a predetermined hunting time elapses, the animal tracking apparatus 100 is controlled to apply a stimulus or emit a sound as a return command. After waiting a predetermined time from the return command, the animal tracking device 100 may try to communicate to the relay unit 200.

Figure 8:
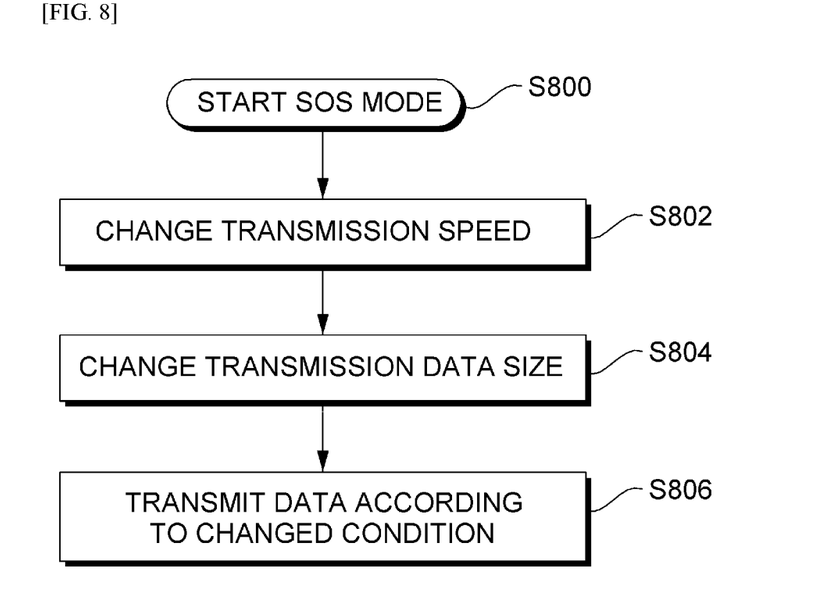
FIG. 8 is a flowchart illustrating an SOS mode in the animal location tracking method according to the exemplary embodiment of the present invention.

FIG. 8 is a flowchart illustrating the SOS mode in the animal location tracking method according to the exemplary embodiment of the present invention.

The SOS mode is started (S800). First, a communication speed of the first communication unit 120 of the animal tracking device 100 is changed (S802). Here, the communication speed may be understood to mean the quantity of transmission of data per hour. For example, when data is transmitted in a normal state at 10 kbps (kilobits per second), the communication speed may be decreased to 1 kbps in operation S802. The reason is that a transmission rate of the signal is changed according to a communication speed of an RF signal, and a transmission rate of a signal may be improved by decreasing a communication speed.

The main control unit 102 changes a transmission data size to be transmitted through the first communication unit 120 (S804). The change of the transmission data size can be performed by the change of a transmission data format. The transmission data format may be configured to include device identification information, current location information, animal state information, device state information, and the like, but transmission data in the SOS mode may be set with a minimum size. For example, the transmission data format in the SOS mode may include only device identification information and current location information.

The animal tracking device 100 transmits the signal according to the condition changed according to operations S802 and S804 (S806).

The animal tracking device 100 may perform long-range communication by the execution of the SOS mode, so that a possibility in the direct communication with the relay unit 200 or the communication through the relay mode is increased.

Referring back to FIG. 5, the animal tracking device 100 determines whether the battery level is normal by periodically monitoring the battery level while performing the SOS mode (S520). When the battery level is equal to or smaller than the reference value, the save mode is executed (S514). In this case, the SOS mode and the save mode are executed together, so that the animal tracking device 100 continuously makes an attempt to communicate with the user while minimizing the consumption of the battery.

When the communication with the animal tracking device 100 is not performed, so that it is impossible to recognize the current location of the animal tracking device 100, the navigation unit 300 presents a final location of the animal tracking device 100 to the user. The user may move to the final location of the animal tracking device 100, and move together with other animals or other users and search for an animal, of which a location is not recognized. As suggested in the present invention, the animal tracking device 100 continues to make an attempt to perform the direct communication with the user or the communication with the user through the relay mode while minimizing the consumption of the battery, thereby maximizing a possibility in that the user finds the animal wearing the corresponding animal tracking device 100.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An animal tracking device, which is worn by an animal and tracks a location of the animal, the animal tracking device comprising:

a location determining unit configured to determine a current location according to information received from a GPS antenna;

a sensor configured to determine state information about the animal;

a device identification information storing unit configured to store device identification information for identifying a device;

a battery configured to supply power;

a first communication unit configured to perform RF communication with a user's device; and a main control unit, which controls the device, and controls the first communication unit to communicate with the user's device through another animal tracking device registered in the user's device, or an animal tracking device registered in another user's device sharing information with the user's device when the first communication unit and the user's device are abnormally communicated, wherein the main control unit determines whether a first communication between the first communication unit and the user's device is normal and executes a relay mode when the first communication is abnormal, wherein, in the relay mode, a second communication between the first communication unit and the user's device is performed through the other animal tracking device registered in the user's device or the animal tracking device registered in the other user's device, wherein the main control unit executes an SOS mode when the main control unit determines that second communication in the relay mode has failed, and wherein, in the SOS mode, a third communication between the animal tracking device and the user's device is performed, the third communication having a lower transmission speed and a different data format than the second communication.

2. The animal tracking device of claim 1, wherein when a battery level of the battery is abnormal, the main control unit controls the animal tracking device in a save mode which increases a transmission period of the first communication unit.

3. The animal tracking device of claim 2, wherein when the battery level is abnormal, the main control unit turns off a reception function of the first communication unit, and increases a reception period of the GPS antenna.

4. The animal tracking device of claim 1, wherein when the current location goes beyond a predetermined boundary or a predetermined distance from the user's device, or a current time elapses a predetermined time, the main control unit gives a return command by operating a stimulating unit, which applies a stimulus to the animal, or outputting a sound through a speaker.

5. The animal tracking device of claim 1, wherein the user's device includes a relay unit including a second communication unit communicating with the first communication unit, and a navigation unit communicating with the relay unit through a short range communication network and including a visual display, and the animal tracking device communicates with the navigation unit through the relay unit.

6. The animal tracking device of claim 1, wherein when the communication with the user's device is not performed, the main control unit decreases a transmission rate of the first communication unit.

7. The animal tracking device of claim 6, wherein the main control unit changes a transmission data format to be transmitted through the first communication unit and decreases a size of data to be transmitted.

8. A system for tracking a location of an animal, which includes an animal tracking device worn by an animal, and a user's device communicating with the animal tracking device,
wherein the user's device includes a relay unit, which performs RF communication with the animal tracking device, displays information transmitted from the animal tracking device, outputs a control signal controlling the animal tracking device, performs short range communication with a navigation unit including a GPS receiver and a visual display, and relays communication between the animal tracking device and the navigation unit,
wherein the animal tracking device includes:
a location determining unit configured to determine a current location according to information received from a GPS antenna;
a sensor configured to determine state information about the animal;
a device identification information storing unit configured to store device identification information for identifying a device;
a battery configured to supply power;
a first communication unit configured to perform RF communication with a user's device; and
a main control unit configured to control the animal tracking device,
wherein when the communication between the relay unit and the animal tracking device is abnormally performed, the communication between the relay unit and the animal tracking device is performed through another animal tracking device registered in the relay unit, or an animal tracking device registered in another relay unit sharing information with the relay unit,
wherein the main control unit determines whether a first communication between the first communication unit and the user's device is normal and executes a relay mode when the first communication is abnormal,
wherein, in the relay mode, a second communication between the first communication unit and the user's device is performed through the other animal tracking device registered in the user's device or the animal tracking device registered in the other user's device,
wherein the main control unit executes an SOS mode when the main control unit determines that second communication in the relay mode has failed, and
wherein, in the SOS mode, a third communication between the animal tracking device and the user's device is performed, the third communication having a lower transmission speed and a different data format than the second communication.

9. The system of claim 8, wherein the navigation unit is a smart phone, and the navigation unit displays the current location of the animal tracking device on a map provided to the navigation unit together with a current location of the navigation unit.

10. The system of claim 9, wherein the plurality of navigation units is included, and the plurality of relay units is included in each of the navigation unit, and information from the animal tracking device registered to any one relay unit is shared with another relay unit.

11. The system of claim 8, wherein when a battery level of the battery is abnormal, the main control unit of the animal tracking device controls the animal tracking device in a save mode which increases a transmission period of the first communication unit.

12. The system of claim 8, wherein when the current location of the animal tracking device goes beyond a predetermined boundary or a predetermined distance from the user's device, or a current time elapses a predetermined time, the animal tracking device gives a return command by operating a stimulating unit, which applies a stimulus to the animal, or outputting a sound through a speaker.

13. The system of claim 8, wherein when the communication between the animal tracking device and the relay unit is not performed, the main control unit of the animal tracking device decreases a communication speed of the first communication unit.

14. The system of claim 13, wherein the main control unit changes a transmission data format to be transmitted through the first communication unit and decreases a size of data to be transmitted.

15. A method of tracking a location of an animal, which includes an animal tracking device worn by an animal, and a user's device communicating with the animal tracking device, the method comprising:
setting a basic condition for tracking the animal, the basic condition including at least one of a movement boundary or distance and an operation time of the animal tracking device, and performing a normal operation mode which tracks a location of the animal through communication between the animal tracking device and the user's device;
determining whether a state of the communication between the animal tracking device and the user's device is normal; and when the state of the communication between the animal tracking device and the user's device is abnormal, performing a relay mode which makes an attempt to communicate with the user's device through another animal tracking device registered in the user's device, or an animal tracking device registered in another user's device sharing information with the user's device, wherein determining whether a state of the communication is normal includes determining whether a first communication between a first communication unit and the user's device is normal and executing the relay mode when the first communication is abnormal, and wherein, in the relay mode, a second communication between the first communication unit and the user's device is performed through the other animal tracking device registered in the user's device or the animal tracking device registered in the other user's device, wherein the main control unit executes an SOS mode when the main control unit determines that second communication in the relay mode has failed, and wherein, in the SOS mode, a third communication between the animal tracking device and the user's device is performed, the third communication having a lower transmission speed and a different data format than the second communication.

16. The method of claim 15, wherein when the set basic condition is not satisfied, the animal tracking device gives a return command by operating a stimulating unit, which applies a stimulus to the animal, or outputting a sound through a speaker.

17. The method of claim 15, further comprising:

when a battery level of a battery included in the animal tracking device is equal to or smaller than a predetermined reference value, performing, by the animal tracking device, a save mode, which decreases the quantity of power consumed of the battery by increasing a transmission period of a first communication unit.

18. The method of claim 15, wherein the user's device includes a relay unit including a second communication unit communicating with a first communication unit provided in the animal tracking device, and a navigation unit communicating with the relay unit through a short range communication network and including a visual display, and the animal tracking device communicates with the navigation unit through the relay unit.

* * * * *